(12) United States Patent
Fulton et al.

(10) Patent No.: US 11,015,539 B2
(45) Date of Patent: May 25, 2021

(54) SYSTEMS AND METHODS FOR REDUCING EXHAUST VALVE DEGRADATION

(71) Applicant: Ford Global Technologies, LLC, Dearborn, MI (US)

(72) Inventors: Brien Lloyd Fulton, Bloomfield Hills, MI (US); Frank M. Korpics, Belleville, MI (US); Aaron John Oakley, Chelmsford (GB); Kirk Andrew Parrish, Grass Lake, MI (US); Sanket Anil Gujarathi, Canton, MI (US); Nicholas Sovis, Ypsilanti, MI (US); Dayton Brenner, South Lyon, MI (US); Joseph Goode, Northville, MI (US); Nicholas John Vella, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/589,000

(22) Filed: Sep. 30, 2019

(65) Prior Publication Data
US 2021/0095607 A1    Apr. 1, 2021

(51) Int. Cl.
*F02D 41/00* (2006.01)
*F01N 3/02* (2006.01)
*F01N 3/023* (2006.01)

(52) U.S. Cl.
CPC ......... *F02D 41/008* (2013.01); *F01N 3/023* (2013.01); *F02D 2200/02* (2013.01); *F02D 2200/101* (2013.01)

(58) Field of Classification Search
CPC ........ F02D 41/00; F02D 41/008; F02D 41/14; F01N 3/02; F01N 3/023; F01N 13/18; F01N 13/1833; F01N 11/00; F01N 2430/04
USPC ..... 73/35.01, 35.03, 114.48, 114.52, 114.53; 701/101–105, 114
See application file for complete search history.

(56) References Cited

U.S. PATENT DOCUMENTS

| 4,962,740 | A | * | 10/1990 | Fujimoto | ............... | G01M 15/11 |
| | | | | | | 123/481 |
| 5,035,220 | A | * | 7/1991 | Uchinami | ........... | F02D 41/1498 |
| | | | | | | 123/436 |
| 5,213,081 | A | * | 5/1993 | Fujimoto | ............ | F02D 41/1408 |
| | | | | | | 123/436 |
| 6,959,541 | B2 | | 11/2005 | Kosaka et al. | | |
| 8,272,207 | B2 | | 9/2012 | Kurtz | | |
| 2008/0154485 | A1 | * | 6/2008 | Yasuda | ............... | F02D 41/0025 |
| | | | | | | 701/113 |

(Continued)

*Primary Examiner* — Logan M Kraft
*Assistant Examiner* — Johnny H Hoang
(74) *Attorney, Agent, or Firm* — Geoffrey Brumbaugh McCoy Russell LLP

(57) ABSTRACT

Methods and systems are provided for identifying when an exhaust valve of an engine cylinder is not functioning as desired while the engine is being operated to raise a temperature of an exhaust system emissions control device, and in turn taking mitigating action. Thus, in one example a method comprises adjusting an amount of fuel that is provided to each of a plurality of cylinders of an engine during an exhaust stroke of the engine in response to an indication of degraded combustion stemming from a cylinder of the engine. In this way, the engine may continue to be operated to raise the temperature of the exhaust system emissions control device, while mitigating the issue of the degraded combustion.

10 Claims, 5 Drawing Sheets

(56) References Cited

U.S. PATENT DOCUMENTS

| | | | |
|---|---|---|---|
| 2013/0345950 A1* | 12/2013 | Goto | F02D 19/081 |
| | | | 701/104 |
| 2018/0003120 A1* | 1/2018 | Nakano | F02D 41/34 |
| 2018/0058358 A1* | 3/2018 | Guo | F02D 41/1498 |

* cited by examiner

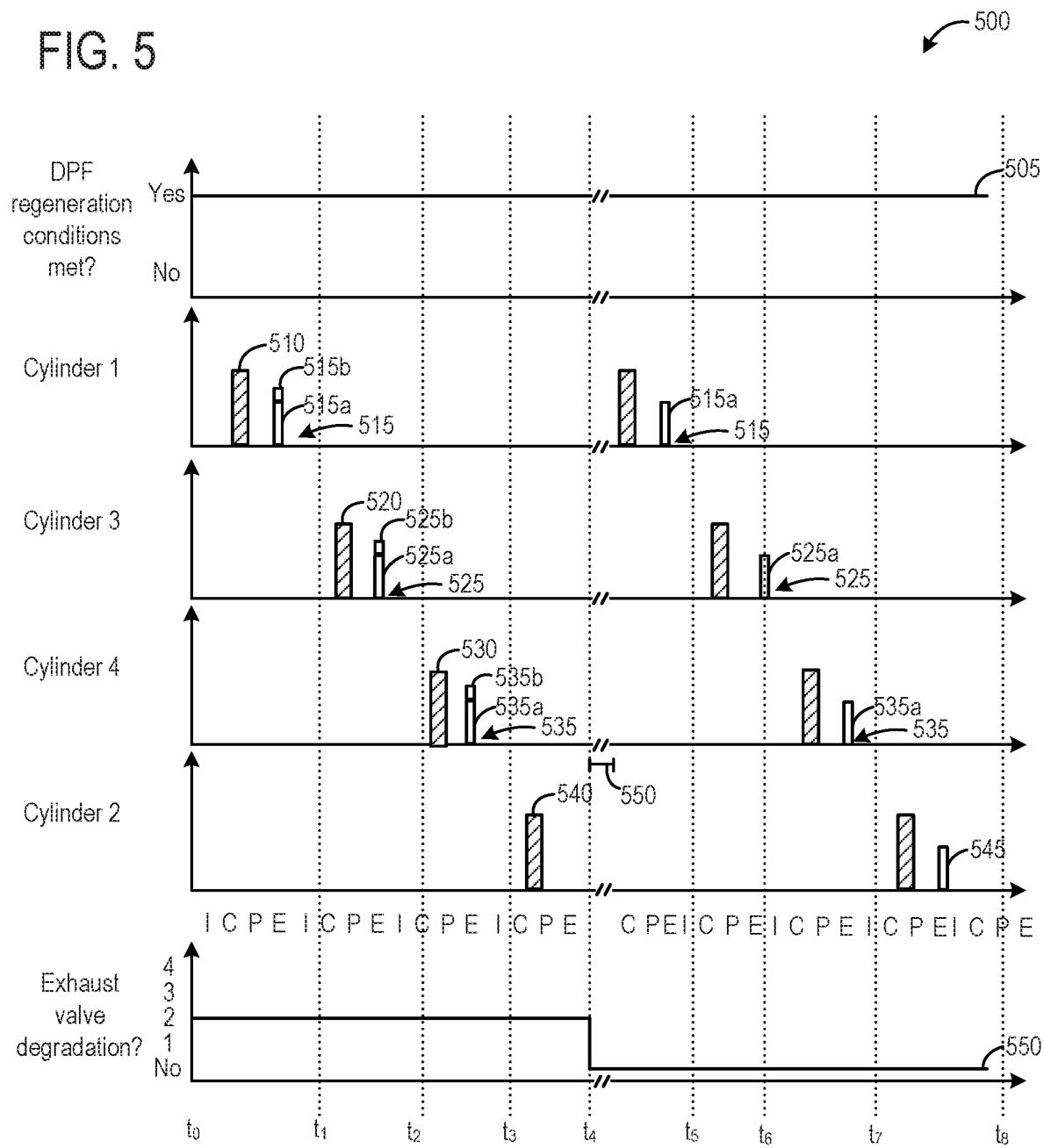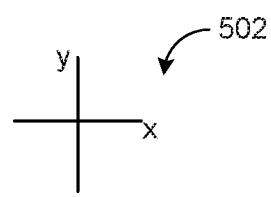

SYSTEMS AND METHODS FOR REDUCING EXHAUST VALVE DEGRADATION

FIELD

The present description relates generally to methods and systems for detecting exhaust valve sticking resulting from late post in-cylinder injections that are used to raise a temperature of an exhaust emissions control device.

BACKGROUND/SUMMARY

Some particulate filters (PFs) may be cleaned while an engine is in operation via a process called regeneration. During regeneration, the filter is heated above its normal operating temperature to oxidize or burn off particulates that have accumulated in the filter. In addition to, or instead of, employing a heater to increase the temperature of the filter, the engine may be operated in a manner which may assist in the heating of the particulate filter.

One approach to increase the temperature of the filter during regeneration is disclosed in U.S. Pat. No. 6,959,541. In the cited reference, a fuel injection control system performs a post injection (following a main injection) late in an expansion (e.g., power) stroke or early in an exhaust stroke when heat for regeneration of a particulate filter is desired. As such, fuel is supplied to the exhaust passage which is available for oxidation by an oxidation catalyst, thus creating heat to increase the temperature of the particulate filter for regeneration.

However, the inventors herein have recognized potential issues with such an approach.

Specifically, the late post in-cylinder injection used to provide hydrocarbons to the exhaust for raising a temperature of the particulate filter can result in sticking of an exhaust valve associated with a cylinder that receives the late post in-cylinder injection. For example, as cylinder gasses start to leak past the sticking exhaust valve, an amount of hydrocarbons exposed to a valve stem and guide interface of the exhaust valve can increase to high levels, thereby worsening the sticking condition. This also may expose any existing hydrocarbons in the guide interface to the combustion heat and gasses, which may increase recovery time from the sticking condition. Such an issue may not be limited to operating the engine in a regenerative mode for regenerating the particulate filter, but may also apply to situations where the engine is operated in similar fashion in a heat mode of operation, where the late post in-cylinder fuel injection is used to rapidly raise a temperature of an exhaust catalyst to a desired operational temperature, such as may occur at an engine cold-start event.

Thus, the inventors herein have developed systems and methods to at least partially address the above-mentioned issues. In one example, a method comprises adjusting an amount of a fuel that is provided to each of a plurality of cylinders of an engine during an exhaust stroke of the engine in response to an indication of a degraded combustion quality stemming from a cylinder that is one of the plurality of cylinders receiving the fuel. In this way, the issue of the degraded combustion quality may be mitigated, which may reduce or avoid adverse issues stemming from operating the engine under the condition of degraded combustion.

As one example, the degraded combustion quality may be due to an operational degradation of an exhaust valve of the cylinder, for example the operational degradation may relate to the exhaust valve sticking in a partially open position. The engine may comprise a diesel engine. As another example, adjusting the amount of the fuel may include discontinuing providing the fuel to the cylinder for which the degraded combustion quality is indicated. Adjusting the amount of the fuel may further include increasing the amount of fuel provided to the plurality of cylinders excluding the cylinder for which the degraded combustion quality is indicated.

As another example, the method may further comprise providing the fuel to each of the plurality of cylinders of the engine in response to a request to raise a temperature of an emissions control device to a desired temperature.

As another example, the method may further comprise providing each of the plurality of cylinders of the engine with a main fuel injection that occurs between a compression stroke and a power stroke of the engine. The method may include advancing a timing of the main fuel injection for the cylinder for which the degraded combustion quality is indicated, and maintaining the timing of the main fuel injection for each of the plurality of cylinders that do not include the cylinder for which the degraded combustion quality is indicated.

As yet another example, the method may further comprise restoring the amount of the fuel that is provided to each of the plurality of cylinders to an original amount subsequent to the adjusting, responsive to an indication that the cylinder is no longer associated with the degraded combustion quality. Restoring the amount of fuel to the original amount may occur after a threshold time duration of a threshold number of engine cycles from a point when the cylinder is determined to no longer be associated with the degraded combustion quality.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 depicts another prophetic example of how the method of FIG. 3 is used to mitigate the exhaust valve sticking condition.

DETAILED DESCRIPTION

Figure 1:
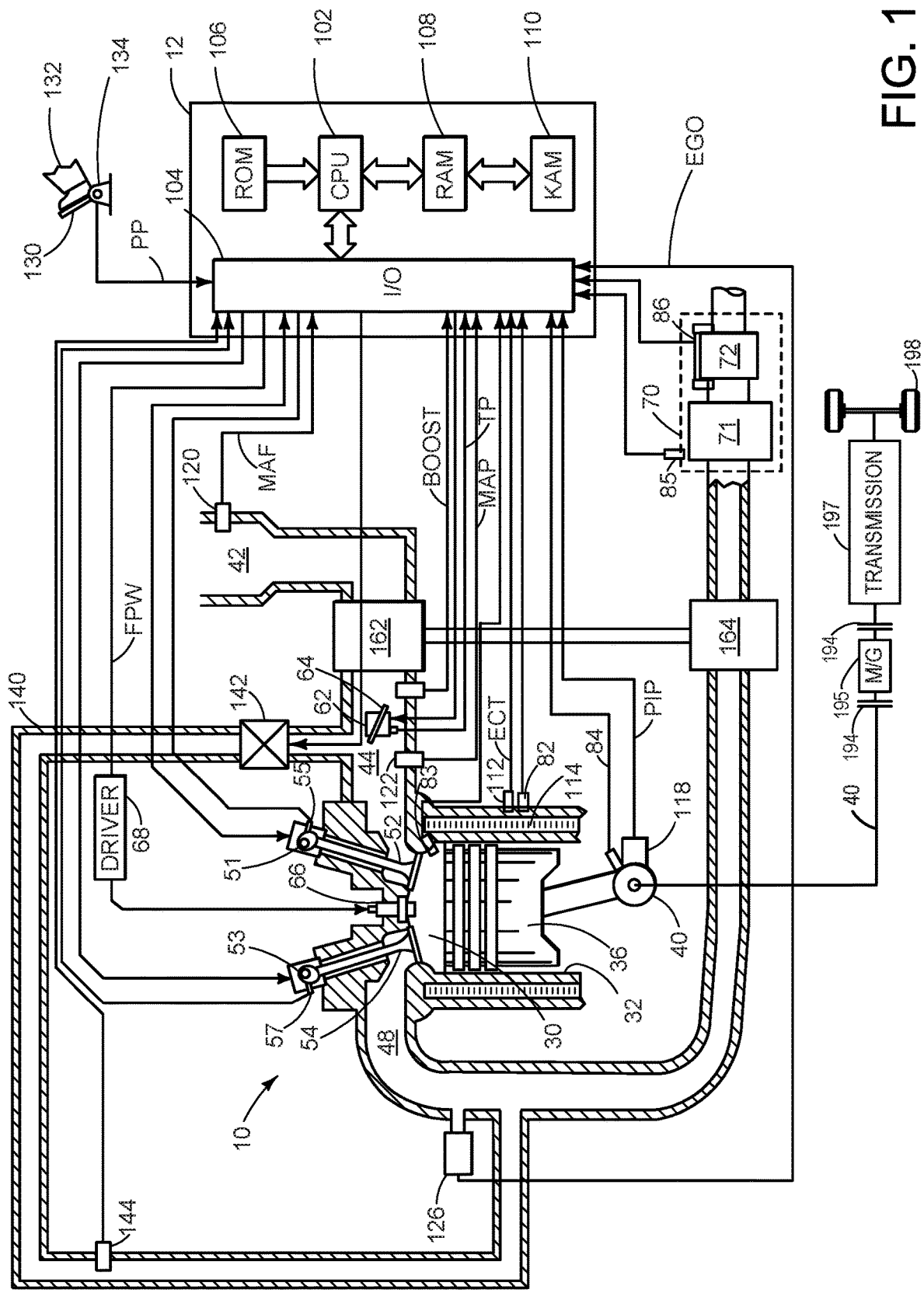
FIG. 1 shows a schematic diagram of an engine.
Figure 2:
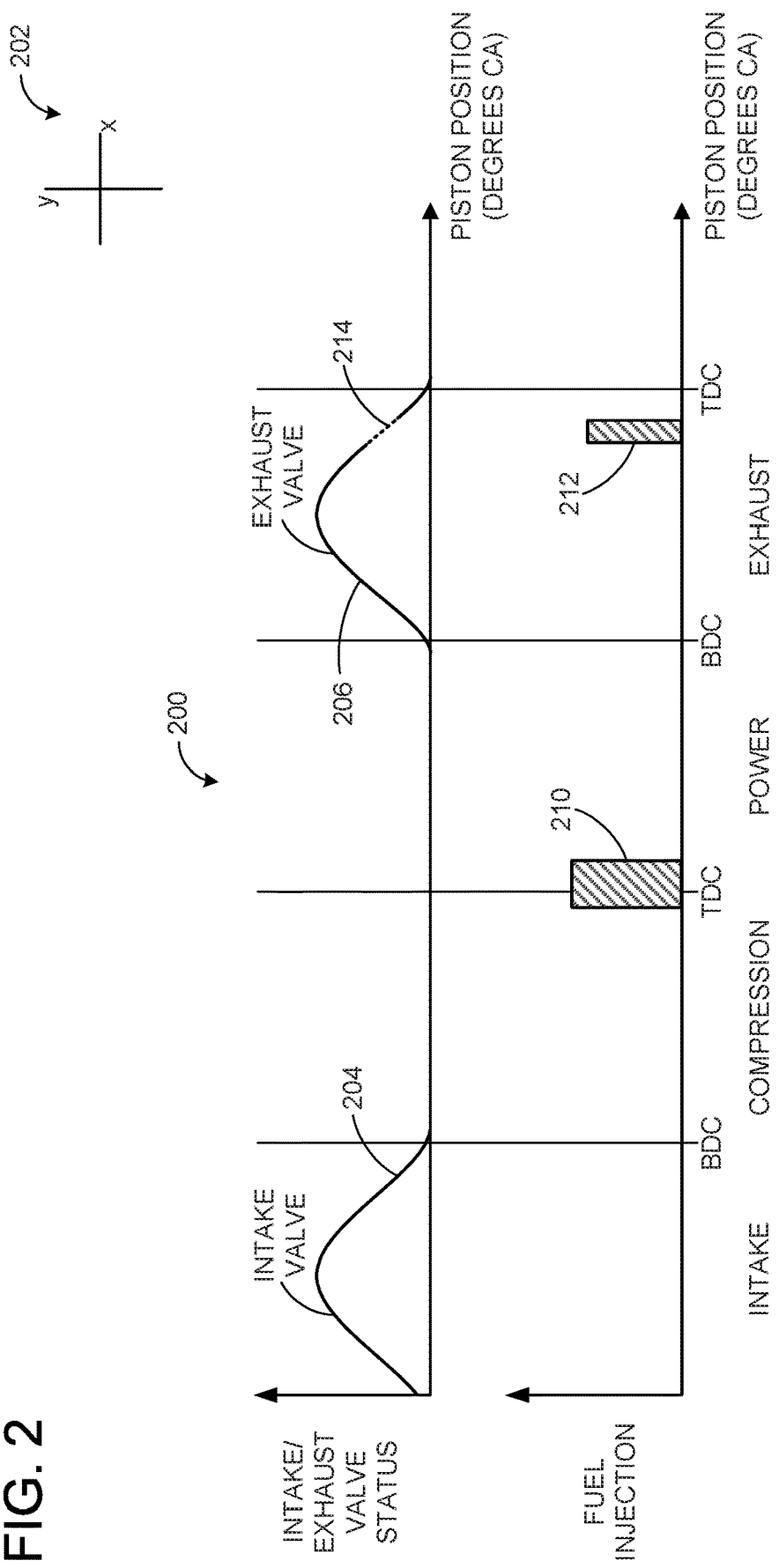
FIG. 2 is a timing chart showing the relationship between intake and exhaust valve lifting amounts and fuel injection.
Figure 3:
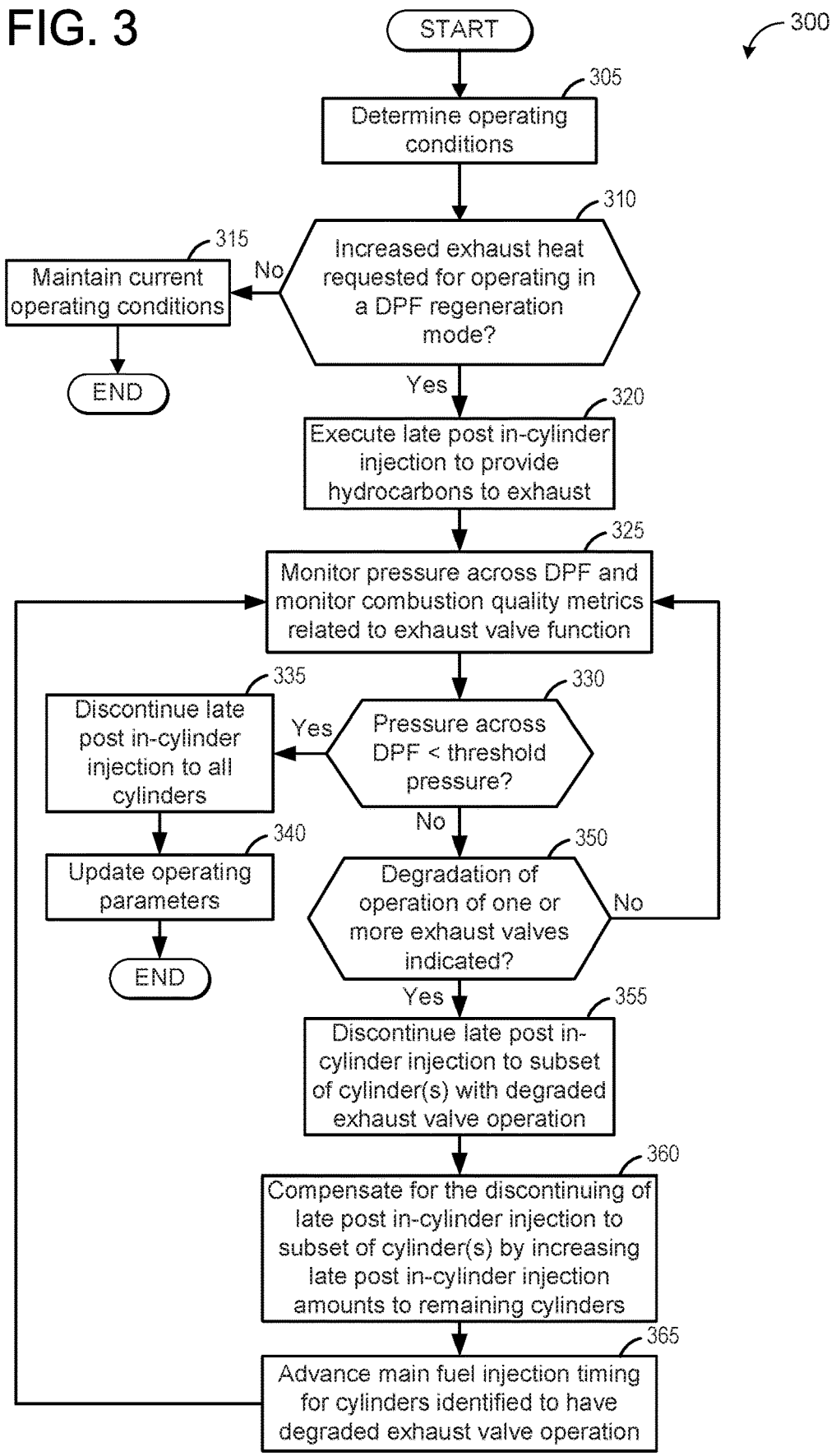
FIG. 3 depicts a high-level example method for detecting and mitigating an exhaust valve sticking condition in a cylinder that is being provided late post in-cylinder fuel injections.
Figure 4:
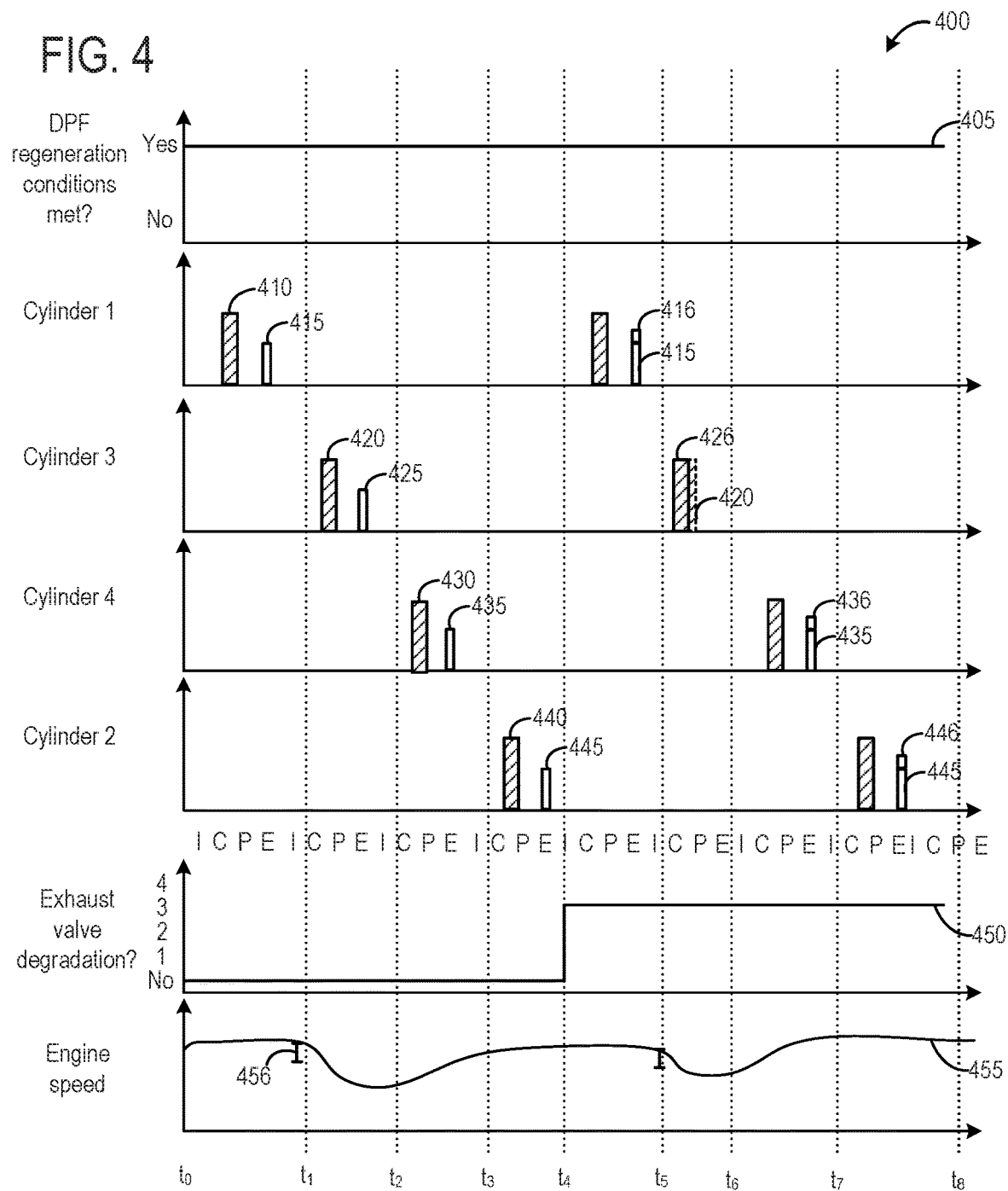
FIG. 4 depicts a prophetic example of how the method of FIG. 3 is used to mitigate the exhaust valve sticking condition.

The following description relates to systems and methods for inferring whether an exhaust valve associated with a particular engine cylinder is exhibiting degraded operation (e.g., sticking) while the engine system is being operated in a heat mode to rapidly raise a temperature of an exhaust catalyst and/or a regenerative mode where increased exhaust heat is used to regenerate a particulate filter (e.g., diesel particulate filter, DPF). Responsive to an exhaust valve being inferred to be exhibiting the degraded operation, mitigating action may be taken to restore function of the exhaust valve to a level that is expected or desired. Accordingly, FIG. 1 depicts an example illustration showing one cylinder of a multi-cylinder engine, including an exhaust valve and an emissions control device that includes a catalyst and a DPF. The manner in which the engine is operated in the heat mode and/or regenerative mode may include providing one or more cylinders of the engine with late post in-cylinder fuel injections, such that unburnt hydrocarbons are communicated to the exhaust for increasing temperature of the components of the emissions control device. Accordingly, a timing chart is depicted at FIG. 2, showing where in relation to a main fuel injection, the late post in-cylinder fuel injections occur. A method for operating the engine in the regenerative mode is depicted at FIG. 3, and the method may include monitoring for exhaust valve operational degradation, and when such degradation is inferred, taking mitigating action to reverse the issue. While the method of FIG. 3 is discussed in relation to operating the engine in the regenerative mode, similar principles may be applied to operation of the engine in the heat mode, as discussed in detail herein. FIGS. 4-5 depict prophetic example timelines detailing how the method of FIG. 3 may be used for DPF regeneration procedures, such that adverse issues stemming from exhaust valve operational degradation may be reduced or avoided.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein. Fuel injection may be via a common rail system, or other such diesel fuel injection system. Fuel may be delivered to fuel injector 66 by a high pressure fuel system (not shown) including a fuel tank, a fuel pump, and a fuel rail.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Further, in the disclosed embodiments, an exhaust gas recirculation (EGR) system may route a desired portion of exhaust gas from exhaust passage 48 to intake passage 44 via EGR passage 140. The amount of EGR provided to intake passage 44 may be varied by controller 12 via EGR valve 142. Further, an EGR sensor 144 may be arranged within the EGR passage and may provide an indication of one or more pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust O2 sensor and/or an intake oxygen sensor (intake manifold). Under some conditions, the EGR system may be used to regulate the temperature of the air and fuel mixture within the combustion chamber. While FIG. 1 shows a high pressure EGR system, additionally, or alternatively, a low pressure EGR system may be used where EGR is routed from downstream of a turbine of a turbocharger to upstream of a compressor of the turbocharger.

As such, engine 10 may further include a compression device such as a turbocharger or supercharger including at least a compressor 162 arranged along intake manifold 44. For a turbocharger, compressor 162 may be at least partially driven by a turbine 164 (e.g. via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

Exhaust gas sensor 126 is shown coupled to exhaust passage 48 upstream of emission control system 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Engine 10 may in some examples include one or more knock sensor(s) 82. For example, knock sensor 82 may be coupled to each cylinder 30 of engine 10, for identifying abnormal cylinder combustion events. In other examples, one or more knock sensors 82 may be coupled to selected locations of the engine block. In one example, based on output of knock sensor 82 in one or more defined windows (e.g. crank angle timing windows), abnormal combustion due to one or more of knock and pre-ignition may be identified.

Engine 10 may in some examples include one or more in-cylinder pressure sensor(s) 83. For example, each cylinder of engine 10 may include in-cylinder pressure sensor 83, or a select number of cylinders of engine 10 may include in-cylinder pressure sensor(s) 83. The in-cylinder pressure sensor(s) may enable real-time combustion sensing for individual cylinders, and may provide in-cylinder combustion pressure information to enable a combustion parameter calculation to be performed via controller 12.

Engine 10 may in some examples include a torque sensor 84. Generally speaking, torque sensor 84 may include a device for measuring and recording the torque of a rotating system, such as crankshaft 40 (or more generally engine 10). While not explicitly illustrated, in other examples torque sensor 84 may include two angular position sensors whereby the phase angle of twist resulting from applied torque is measured via the two angular position sensors, and from the phase angle, torque (e.g., of crankshaft 40) may be determined.

Emission control system 70 is shown arranged along exhaust passage 48 downstream of exhaust gas sensor 126. System 70 may be a selective catalytic reduction (SCR) system, three way catalyst (TWC), NOx trap, various other emission control devices, or combinations thereof. For example, system 70 may be an SCR system which includes an SCR catalyst 71 and a diesel particulate filter (DPF) 72. In some embodiments, DPF 72 may be located downstream of the catalyst (as shown in FIG. 1), while in other embodiments, DPF 72 may be positioned upstream of the catalyst (not shown in FIG. 1). In some examples, during operation of engine 10, DPF 72 may be periodically regenerated via the use of late post in-cylinder fuel injection to provide hydrocarbons to the exhaust for raising a temperature of DPF 72, as will be elaborated in greater detail below. Similarly, late post in-cylinder fuel injection may be used during a heat mode, for example at an engine start event, to rapidly raise a temperature of the emission control system 70. Accordingly, an emissions control system temperature sensor 85 may be used for determining when temperature of the DPF, for example, is at a desired temperature (e.g., equal to or greater than a predetermined threshold temperature). Furthermore, a differential pressure sensor 86 may be used to monitor a pressure across DPF 72. DPF regeneration may be requested, for example, when pressure across DPF exceeds a first predetermined pressure threshold. During the process of regenerating DPF 72, pressure across DPF 72 may again be monitored and it may be determined that the regeneration process is complete when pressure is across DPF 72 is below a second predetermined pressure threshold. For example, the second predetermined pressure threshold may be lower than the first predetermined pressure threshold.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

In some examples, sensor 118 may be used to indicate misfire in a particular engine cylinder. Discussed herein, misfire may be understood to refer to when a particular cylinder of the engine is degraded in its ability to carry out one or more processes of its combustion cycle. This may result in the engine running rough, jerking, or bucking, and also may result in the engine running inefficiently. Sensor 118 may be used to detect misfire based on successive signals output from sensor 118 to controller 12. More specifically, a calculated pulse time of sensor 118 that is correlated with engine rotational speed may be compared to a predetermined reference value for determining misfire of a particular cylinder. Said another way, a fall in engine rotational speed may be indicated when misfire has occurred, as compared to a reference engine rotational speed corresponding to an absence of misfire. Thus, misfire for a particular cylinder may be determined via an indication of a drop in engine rotational speed based on an observed change in pulse time corresponding to sensor 118.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug (where included), etc.

In some examples, engine 10 may be included in a hybrid electric vehicle (HEV) or plug-in HEV (PHEV), with multiple sources of torque available to one or more vehicle wheels 198. In the example shown, vehicle system 100 may include an electric machine 195. Electric machine 195 may be a motor or a motor/generator. Crankshaft 40 of engine 10 and electric machine 195 are connected via a transmission 197 to vehicle wheels 198 when one or more clutches 194 are engaged. In the depicted example, a first clutch is provided between crankshaft 199 and electric machine 195, and a second clutch is provided between electric machine 195 and transmission 197. Controller 12 may send a signal to an actuator of each clutch 194 to engage or disengage the clutch, so as to connect or disconnect crankshaft 40 from electric machine 195 and the components connected thereto, and/or connect or disconnect electric machine 195 from transmission 197 and the components connected thereto. Transmission 197 may be a gearbox, a planetary gear system, or another type of transmission. The powertrain may be configured in various manners including as a parallel, a series, or a series-parallel hybrid vehicle.

Electric machine 195 may receive electrical power from a traction battery 196 to provide torque to vehicle wheels 198. Electric machine 195 may also be operated as a generator to provide electrical power to charge traction battery 196, for example during a braking operation.

Thus, discussed herein, a system for a vehicle may include an engine with a plurality of engine cylinders each of which include an intake valve, an exhaust valve, and a fuel injector. The system may further include an emissions control device positioned in an exhaust system of the engine. The system may further include a controller with computer readable instructions stored on non-transitory memory. When executed, the instructions may cause the controller to command a main fuel injection for each of the plurality of engine cylinders, the main fuel injection occurring between a compression stroke and a power stroke. The instructions may further cause the controller to receive a request to increase a temperature of the emissions control device. The instructions may further cause the controller to provide a first late fuel injection amount to each of the plurality of engine cylinders subsequent to the main fuel injection. The instructions may further cause the controller to monitor each of the plurality of engine cylinders for an indication of degraded combustion while commanding the first late fuel injection amount to each of the plurality of engine cylinders. The instructions may further cause the controller to, in response to a cylinder being identified as having degraded combustion, discontinue providing the first late fuel injection amount to the cylinder, and providing a second fuel injection amount to remaining engine cylinders of the plurality of engine cylinders.

For such a system, the controller may store further instructions to advance a timing of the main fuel injection to the cylinder identified as having degraded combustion, without advancing the timing of the main fuel injection to remaining engine cylinders.

For such a system, the controller may further comprise an engine speed sensor. In such an example, the controller may store further instructions to provide the indication of degraded combustion in response to an engine speed change greater than a threshold engine speed change stemming from combustion in the cylinder.

For such a system, each of the plurality of engine cylinders may further comprise a pressure sensor. The controller may store further instructions to monitor a maximum pressure in each of the plurality of engine cylinders that are receiving the first late fuel injection amount per engine cycle, and provide the indication of degraded combustion for the cylinder when the maximum pressure is greater than a threshold different than an expected maximum pressure.

For such a system, the controller may store further instructions to divide the first late fuel injection amount by a number of remaining engine cylinders in response to discontinuing providing the first late fuel injection amount to the cylinder to obtain an adjusted fuel amount. In such an example, the second fuel injection amount may be a sum of the first late fuel injection amount and the adjusted fuel amount.

As mentioned above, late post in-cylinder fuel injection may in some examples be used during a heat mode of engine operation where it is desirable to rapidly raise a temperature of the emissions control device (e.g. emissions control device 70 at FIG. 1), for example at an engine cold-start event, or in a regenerative mode of engine operation where increasing temperature of the DPF (e.g. DPF 72 at FIG. 1) is used to burn off accumulated soot.

Accordingly, an example of late post in-cylinder injection is depicted at timing chart 200 of FIG. 2, which details a relationship between intake and exhaust valve operation and fuel injection. Discussed herein, fuel injection that does not include the late post in-cylinder fuel injection is referred to as a main injection. Said another way, the main injection of fuel may be understood to be used for propelling the vehicle, and not for specifically raising exhaust temperature (as compared to late fuel injection, or late post in-cylinder fuel injection). With regard to timing chart 200, both the top plot and the bottom plot depict piston position in crank angle (CA) degrees on the x-axis (refer to inset 202). The top plot depicts intake and exhaust valve opening on the y-axis. It may be understood that intake/exhaust valve opening increases in the direction of the arrow defining the y-axis at FIG. 2. The bottom plot depicts fuel injection. The x-axis of each of the top and bottom plots are divided into four strokes of the engine (intake, compression, power and exhaust strokes). Also depicted is piston position, corresponding to bottom dead center (BDC) and top dead center (TDC). It may be understood that, discussed herein, BDC refers to piston position when the piston (e.g. piston 36 at FIG. 1) is nearest the crankshaft (e.g. crankshaft 40 at FIG. 1), whereas TDC refers to piston position when the piston is farthest from the crankshaft.

The intake valve 204 is depicted as opening and closing during the intake stroke of the engine. The exhaust valve 206 is depicted as opening and closing during the exhaust stroke of the engine. The main fuel injection 210 is illustrated as occurring near TDC between the compression and power strokes of the 4-stroke engine cycle at timing chart 200, and the late post in-cylinder fuel injection 212 is illustrated as occurring in the exhaust stroke. More specifically, the late post in-cylinder fuel injection 212 is depicted as occurring about 40 CA degrees before TDC. In this example timing chart 200 the exhaust valve lift amount, or degree of openness of the exhaust valve, during the late post in-cylinder fuel injection is indicated by a dashed line at 214 of timing chart 400. As shown at 214 in FIG. 2, the exhaust valve is at least partially open (e.g., the valve is lifted) before, during, and after the late post in-cylinder fuel injection 212.

It may be appreciated that timing chart 200 depicts one example of a late post in-cylinder fuel injection for a single cylinder. For example, the timing of the late post in-cylinder fuel injection and the amount of fuel injected via the late post injection may be variable parameters. In some examples, the timing and/or amount of the late post in-cylinder fuel injection may be based on an amount of heat requested to increase the temperature of the DPF (e.g., the amount of the desired exotherm) and/or the difference between the current temperature and the desired temperature of the of the DPF.

Similarly, the amount of fuel injected during the late post injection may be based on the difference between the current temperature and the desired temperature of the DPF and/or an exhaust air-fuel ratio (e.g., an amount of excess oxygen in the exhaust). For example, if the air-fuel ratio in the exhaust is high, a greater amount of fuel may be desired during the late post injection in order to increase the amount of fuel available for oxidation by the catalyst, and/or to increase the temperature rise due to a greater exotherm with a greater amount of injected fuel in the late post in-cylinder fuel injection.

Furthermore, during a single DPF regeneration, the late post in-cylinder fuel may occur during one or more engine cycles and the amount and timing of the injection may vary. As an example, the late post injection may occur during three subsequent engine cycles. In another example, the late post injection may occur every other engine cycle throughout a span of ten engine cycles. As described above, the number of engine cycles in which the late post injection occurs and the amount and timing of the injection may depend on parameters such as desired amount of the exotherm at the catalyst and exhaust air-fuel ratio.

Thus, timing chart 200 depicts one example of late post in-cylinder fuel injection as an illustrative example for a single cylinder. It may be understood that, while timing chart 200 depicts a single cylinder, late post in-cylinder fuel injection may be conducted for a plurality of engine cylinders under circumstances where it is desired to raise a temperature of the DPF. As one example, all of the cylinders of the engine may receive late post in-cylinder fuel injection responsive to a request to raise the temperature of the DPF. In other examples, a fraction of all the cylinders of the engine may receive late post in-cylinder fuel injection responsive to a request to raise the temperature of the DPF. In some examples, the number of cylinders which receive the late post in-cylinder fuel injections may be a function of the desired amount of the exotherm of the catalyst.

As mentioned above, the action of providing fueling to a cylinder or cylinders of the engine during the exhaust stroke may result in degraded exhaust valve function. Said another way, an exhaust valve associated with a cylinder that is receiving late post in-cylinder fuel injections may be subject to hydrocarbons at locations of the exhaust valve such as the valve stem and guide interface, which may thereby result in a sticking of the particular exhaust valve. A stuck exhaust valve may result in a variety of adverse downstream effects on engine operation, and therefore it may be desirable to take mitigating action in response to an indication of degraded exhaust valve function. Such methodology is described below with regard to the methodology of FIG. 3.

Turning now to FIG. 3, an example method 300 for increasing a temperature of an after-treatment device (e.g., DPF 72 at FIG. 1) via providing one or more engine cylinders with late post in-cylinder fuel injection, is shown. Method 300 may include monitoring whether one or more exhaust valves associated with cylinders that are receiving the late post in-cylinder fuel injections are exhibiting degraded operation (e.g., sticking of the exhaust valve), and if so, taking mitigating action to correct the degraded operational condition. Method 300 will be described with reference to the systems and components described herein and shown in FIG. 1, though it may be appreciated that similar methods may be applied to other systems and components without departing from the scope of this disclosure. Instructions for carrying out method 300 and the rest of the methods included herein may be executed by a controller, such as controller 12 at FIG. 1, based on instructions stored in non-transitory memory, and in conjunction with signals received from sensors of the engine system and vehicle powertrain as discussed with regard to FIG. 1. The controller may employ actuators such as the fuel injector(s) (e.g., fuel injector 66 at FIG. 1), etc., to alter state of devices in the physical world according to the methods depicted below.

Furthermore, method 300 is discussed with regard to conducting a DPF regeneration procedure. However, it is herein recognized that similar methodology as that discussed with regard to FIG. 3 may be used for a heat mode where increased exhaust heat is requested for raising a temperature of the emissions control device (e.g., emissions control device 70 at FIG. 1) to a desired operational temperature (e.g., light-off temperature). For example, the heat mode may be requested at an engine cold-start to rapidly raise the temperature of one or more components of the emissions control device to the desired operational temperature so as to reduce release of undesired emissions to the atmosphere. Thus, while method 300 is discussed with regard to DPF regeneration, it may be understood that similar methodology may be used for operation in the heat mode. Accordingly, following the discussion of method 300 that is specific for DPF regeneration, a description of how similar methodology may be used to operate in the heat mode, will be provided.

Method 300 begins at 305 and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine temperature, engine oil temperature, coolant temperature, engine load, engine speed, A/F ratio, manifold air pressure, etc., various fuel system conditions, such as fuel level, fuel type, fuel temperature, etc., as well as various ambient conditions, such as ambient temperature, humidity, barometric pressure, etc.

Proceeding to 310, method 300 includes indicating whether increased exhaust heat is requested for operating the engine system in a DPF regeneration mode. As an example, while the vehicle is in operation, a pressure across the DPF (e.g., DPF 72 at FIG. 1) may be monitored via the differential pressure sensor (e.g., differential pressure sensor 86 at FIG. 1). In response to pressure across the DPF exceeding a predetermined threshold pressure, a DPF regeneration procedure may be requested.

If, at 310, increased exhaust heat is not requested, then method 300 may proceed to 315. At 315, method 300 may include maintaining current engine operating conditions. For example, maintaining current engine operating conditions at 315 may include continuing to provide engine cylinders with a main fuel injection where the fuel provided to the cylinders is combusted, and not providing any late post in-cylinder fuel injections to engine cylinders. Method 300 may then end. While not explicitly illustrated, it may be understood that method 300 may repeatedly query as to whether increased exhaust heat is requested during a drive cycle.

Returning to 310, responsive to a request for increased exhaust heat for DPF regenerative purposes, method 300 may proceed to 320. At 320, method 300 includes initiating the execution of late post in-cylinder fuel injections to engine cylinders. As discussed above with regard to FIG. 2, late post in-cylinder fuel injections for selected cylinders may be timed to occur during the exhaust stroke. In some examples, all engine cylinders may be selected for providing late post in-cylinder fuel injections, whereas in other examples a select number of engine cylinders may be selected for providing the late post in-cylinder fuel injections. Furthermore, an amount of fuel provided for the late post in-cylinder fuel injections may be variable. For example, in terms of DPF regeneration, the amount of fuel and/or number of cylinders selected for late post in-cylinder fuel injection may be a function of current temperature of the DPF, and a desired temperature of the DPF for regenerative purposes. The amount of fuel and/or number of cylinders selected may additionally or alternatively be a function of ambient temperature, with respect to the desired temperature of the DPF for regenerative purposes.

With late post in-cylinder injections initiated, method 300 proceeds to 325. At 325, method 300 includes monitoring pressure across the DPF via the differential pressure sensor (e.g., differential pressure sensor 86 at FIG. 1). While not explicitly illustrated, it may be understood that in some examples, temperature of the DPF may be measured or inferred, to ensure that the temperature of the DPF has been raised to the desired temperature (e.g., 600° C.) for DPF regeneration. As will be elaborated in further detail below, the monitoring of the pressure across the DPF may be used as an indicator as to when the DPF has been regenerated to a desired level.

Furthermore, at 325, method 300 includes monitoring one or more combustion quality metrics pertaining to exhaust valve function. Specifically, as discussed above, the process of providing late post in-cylinder fuel injection to engine cylinders may in some examples result in one or more exhaust valves of the engine becoming stuck in, for example, a partially open position. Thus, monitoring one or more combustion quality metrics may include retrieving information from one or more sensors of the engine system, such that the controller may infer when a particular engine cylinder is associated with a sticking exhaust valve.

One example of such a combustion quality metric may include fuel balance control and/or a misfire monitor. For example, in terms of fuel balance control, the controller may rely on one or more sensors of the engine system to infer whether an amount of fuel injected to each engine cylinder corresponding to the main injection results in an expected amount of torque for the given fuel injection amount. For example, if the amount of fuel provided to engine cylinders for the main injection is the same across all engine cylinders, then it may be expected that each fuel injection may contribute a substantially similar (e.g., within 5% or less, within 2% or less, etc.) amount of engine torque. Thus, the fuel balance control metric may in some examples rely on the engine torque sensor (e.g., torque sensor 84 at FIG. 1) to infer whether a particular engine cylinder is exhibiting degraded torque output for a given amount of fuel injection corresponding to the main injection. An engine cylinder may be determined via the controller to have a sticking exhaust valve in response to the expected torque output corresponding to a main injection differing from the actual torque output by more than a threshold torque difference, for example.

Additionally or alternatively, as mentioned above the combustion quality metric may include an engine cylinder misfire monitor. For example, the misfire monitor may rely on the engine speed sensor (e.g., sensor 118 at FIG. 1). Given an amount of fuel provided to each cylinder corresponding to the main injection, an expected engine speed profile may be inferred. The expected engine speed profile may be compared to an actual engine speed profile, as monitored via the engine speed sensor. The controller may correlate deviations in actual engine speed from the expected engine speed with particular engine cylinders. For example, an abrupt fall in engine rotational speed may be correlated with combustion in a particular engine cylinder, based on a timing of the main injection to the particular engine cylinder and the fall in engine rotational speed. An exhaust valve sticking condition may contribute to such a deviation between expected and actual engine speed corresponding to combustion in a particular engine cylinder, and thus the misfire monitor may enable the controller to infer which particular engine cylinder has an exhaust valve that is sticking in an at least partially open position. As a specific example, a deviation in engine rotational speed as monitored via the engine speed sensor that is more than a threshold speed different than an expected engine rotational speed may indicate a misfire in a particular engine cylinder correlated based on timing of fuel injection with the deviation in engine rotational speed.

Additionally or alternatively, the combustion quality metric may rely on the in-cylinder pressure sensors (e.g., in-cylinder pressure sensor(s) 83 at FIG. 1) for inferring whether a particular engine cylinder is associated with an exhaust valve sticking condition. For example, there may be a maximum expected in-cylinder pressure for each engine cylinder during an engine cycle. In a case where a particular cylinder has an exhaust valve that is sticking in an at least partially open position, the maximum pressure may be significantly reduced as compared to engine cylinders for which the exhaust valve is functioning as desired. The maximum expected in-cylinder pressure may in some examples be inferred as a function of main fuel injection amount, timing of the main fuel injection, fuel volatility, etc. In other examples, the maximum expected in-cylinder pressure may be a monitored pressure, under circumstances where it is known that the exhaust valve is not sticking in the at least partially open position. Responsive to an actual maximum in-cylinder pressure deviating from the expected maximum in-cylinder pressure by more than a threshold amount for a particular engine cylinder, the controller may infer that the exhaust valve associated with the particular engine cylinder is sticking in the at least partially open position.

Additionally or alternatively, the combustion quality metric may rely on knock sensor(s) (e.g. knock sensor 82 at FIG. 1) to infer which particular engine cylinder may be associated with a sticking exhaust valve. For example, output from the knock sensor may be correlated with crank angle timing windows to infer degraded combustion events in a particular engine cylinder. The degraded combustion events may be due to the exhaust valve associated with the particular engine cylinder sticking in the at least partially open position, and thus such degraded combustion events as inferred based on knock sensor output may be relied upon by the controller for inferring which particular cylinder has a sticking exhaust valve.

It may be understood that the above-mentioned combustion quality metrics may be used alone or in combination with one another without departing from the scope of this disclosure. In other words, it may be understood that the above-described combustion quality metrics may not be individually mutually exclusive, but instead may be used in combination to infer particular engine cylinders that have an exhaust valve that is sticking in the at least partially open position.

Proceeding to 330, method 300 includes indicating whether pressure across the DPF as monitored via the differential pressure sensor is less than a predetermined threshold pressure difference. If the pressure difference is less than the predetermined threshold pressure difference before any indication of a sticking exhaust valve associated with one or more engine cylinders, it may be understood that the DPF regeneration procedure has taken place without any indication of exhaust valve sticking, and thus no mitigating actions are taken in such an example.

Accordingly, if, at 330, pressure across the DPF is indicated to be less than the predetermined threshold pressure difference, method 300 proceeds to 335. At 335, method 300 includes discontinuing providing late post in-cylinder fuel injection to each engine cylinder. The main fuel injection may be maintained, and may be a function of driver demand.

Continuing to 340, method 300 includes updating operating parameters. For example, updating operating parameters may include updating a soot loading status of the DPF, based on the DPF regeneration procedure conducted. Method 300 may then end.

Returning to 330, if pressure across the DPF is not less than the predetermined threshold pressure difference, method 300 proceeds to 350. At 350, method 300 includes indicating whether the combustion quality metric(s) indicate operational degradation associated with an exhaust valve. If not, then method 300 returns to 325, where pressure across the DPF is continued to be monitored, and the combustion quality metric(s) continue to be evaluated to assess whether a particular engine cylinder or cylinders is associated with a sticking exhaust valve.

Alternatively, in the event that the combustion quality metric(s) indicate that a particular engine cylinder or engine cylinders have a sticking exhaust valve, method 300 proceeds to 355. At 355, method 300 includes discontinuing the late post in-cylinder fuel injection for the particular engine cylinder or engine cylinders associated with a sticking exhaust valve. Continuing to 360, method 300 includes compensating for the discontinuing of the late post in-cylinder fuel injection, by increasing an amount of fuel provided for the late post in-cylinder fuel injection corresponding to engine cylinders that have not been associated with a sticking exhaust valve. Specifically, a fuel amount corresponding to the late post in-cylinder fuel injection for each engine cylinder that has been determined to have a sticking exhaust valve may be determined. Then, a total fuel amount that equals a sum of late post in-cylinder fuel injection from each cylinder with a sticking exhaust valve may be determined. It may be understood that in the case of a single cylinder with a sticking exhaust valve, then the total fuel amount simply refers to the fuel amount corresponding to the late post in-cylinder fuel injection provided via the single cylinder. It may be further understood that the total fuel amount relates to the amount of fuel for a single late post in-cylinder fuel injection per cylinder associated with degraded exhaust valve operation.

With the total fuel amount corresponding to the late post in-cylinder fuel injections for cylinder(s) with degraded exhaust valve operation determined, the total fuel amount may be divided by the number of remaining engine cylinders that are not associated with degraded exhaust valve operation. As an example, for a four cylinder engine, if one engine cylinder is determined to have degraded exhaust valve operation, then the total fuel amount corresponding to the amount of fuel provided to the cylinder at the late post in-cylinder fuel injection may be divided by three. Then, to compensate for the discontinuing of the late post in-cylinder fuel injection in the cylinder with degraded exhaust valve operation, each of the remaining engine cylinders without degraded exhaust valve operation may be commanded to add ⅓ of the total fuel amount to the already present late post in-cylinder fuel injection amount. In other words, in such a case, the late post in-cylinder fuel injection amount for remaining engine cylinders may be increased by ⅓ of the total fuel amount originally contributed by the single engine cylinder for which degraded exhaust valve function was identified. By performing such compensation, an amount of fuel provided to the exhaust may be maintained, even when late post in-cylinder fuel injection for a cylinder or cylinders is discontinued.

Proceeding to 365, method 300 includes advancing the main fuel injection for engine cylinders for which the late post in-cylinder fuel injection was discontinued. Advancing the main fuel injection may function to reduce opportunity for uncombusted hydrocarbon production which, as discussed above, contributes to the sticking of the exhaust valve(s) of engine cylinders. The amount by which the main fuel injection is advanced may in some examples be a predetermined amount. For example, the main fuel injection may be advanced by 2 crank angle degrees, 5 crank angle degrees, 10 crank angle degrees, 15 crank angle degrees, 20 crank angle degrees, etc.

With the late post in-cylinder fuel injection compensation having been carried out at step 360, and with the main fuel injection having been advanced at 365, method 300 returns to 325, where pressure across the DPF is continued to be monitored, and where combustion quality metrics continue to be evaluated. For example, there may be situations where one or more remaining engine cylinders which are continuing to provide late post in-cylinder fuel injection are determined to have developed a sticking exhaust valve condition. In such an example, the late post in-cylinder fuel injections to such cylinders may be discontinued, and the amount of the late post in-cylinder fuel injections for such cylinder(s) may be dispersed evenly through the remaining engine cylinders that are not associated with degraded exhaust valve operation, in similar fashion as that discussed above. Thus, it may be understood that the remaining engine cylinders may include engine cylinders for which exhaust valve sticking has not been observed for the current DPF regeneration procedure.

However, in some examples where late post in-cylinder fuel injection has been discontinued, monitoring combustion quality metrics at 325 may include monitoring for when the degraded exhaust valve operation is no longer indicated. In other words, the action of discontinuing the late post in-cylinder fuel injection for a particular cylinder, and advancing the main fuel injection, may result in the issue of the sticking exhaust valve being remedied. For example, the combustion metrics may indicate that a particular engine cylinder for which the late post in-cylinder fuel injection was discontinued is no longer associated with fuel balance control issues and/or misfire. As a specific example, the combustion quality metrics may indicate that the monitored engine rotational speed no longer differs from the expected engine rotational speed by greater than the threshold amount, but instead the monitored engine rotational speed is within another threshold speed from the expected engine rotational speed. As another specific example, the combustion quality metrics may indicate that the maximum monitored pressure for a particular engine cylinder no longer differs from expected maximum pressure by more than the threshold pressure difference, but instead is within another threshold difference of the expected maximum pressure. As another example, the combustion quality metrics may indicated that knock is no longer indicated for the particular engine cylinder. In the above such examples, the controller may infer that the sticking exhaust valve condition associated with an engine cylinder for which the late post in-cylinder fuel injection was discontinued, has been remedied such that the exhaust valve is no longer sticking.

In a situation where the sticking exhaust valve issue has been determined to be remedied for a particular engine cylinder, the late post in-cylinder fuel injections may be resumed for the particular engine cylinder. In one example, as soon as it is indicated that the sticking exhaust valve condition for a particular engine cylinder has been remedied, then the late post in-cylinder fuel injections for that particular engine cylinder may resume, and the amount of the late post in-cylinder fuel injections for the other engine cylinders may each be equivalently reduced so that a same fuel amount is provided for the late post in-cylinder fuel injections for each cylinder. In other examples, there may be a threshold amount of time between when a cylinder is indicated to no longer be associated with a sticking exhaust valve, and when the late post in-cylinder fuel injections are enabled to resume. The threshold time may be 30 seconds, 1 minute, 2 minutes, etc. The threshold time may serve to ensure that the exhaust valve sticking condition for an engine cylinder does not immediately become an issue again, as otherwise may be the case if the late post in-cylinder fuel injections were allowed to resume immediately (e.g., 2 seconds or less) when it is indicated that the exhaust valve sticking issue has been remedied.

Thus, the method as described above may continue as discussed until it is indicated that pressure across the DPF is less than the threshold pressure difference (refer to step 330). Once the pressure across the DPF has been determined to be less than the threshold pressure difference, method 300 proceeds to 335, where late post in-cylinder fuel injection for each cylinder may be discontinued. Method 300 may then proceed to 340, where operating parameters may be updated. Similar to that discussed above, updating operating parameters may include updating a soot loading status of the DPF, to reflect the regeneration process conducted. In some examples, updating the operating parameters at 340 may include setting flag(s) at the controller to indicate which of the engine cylinders were associated with sticking exhaust valves during the DPF regeneration procedure. Updating operating parameters at 340 may in some examples further include setting a flag at the controller to indicate which (if any) of the engine cylinders for which degradation of exhaust valve operation was determined, were not able to be remedied by the discontinuing of the late post in-cylinder fuel injection. In some examples where the exhaust valve sticking condition was not able to be remedied via the methodology of FIG. 3, then a malfunction indicator may be illuminated at the vehicle dash, to alert the vehicle operator of a request to service the vehicle. In some examples where the exhaust valve sticking condition was not able to be remedied, the vehicle may be commanded to be operated in an electric-only mode of operation, where the electric machine (e.g. electric machine 195 at FIG. 1) may be relied upon for propelling the vehicle and the engine may be deactivated. Method 300 may then end.

As mentioned above, late post in-cylinder fuel injection may be used not just for DPF regeneration procedures, but may be additionally or alternatively used for a heat mode of operation that functions to raise a temperature of one or more components of an emissions control system (e.g., emissions control system 70 at FIG. 1) to a desired operational temperature. As one specific example, the heat mode may be requested to raise a temperature of the SCR catalyst (e.g. SCR catalyst 71 at FIG. 1) to its light-off temperature, where the light-off temperature is a temperature at which efficient catalytic conversion of exhaust by-products can be achieved. Heat mode may be requested, for example, at an engine cold-start, where it is desirable to rapidly raise the emissions control device to its desired operational temperature in order to reduce release of undesired emissions to the atmosphere.

In terms of operating in the heat mode, similar concepts as those discussed above with regard to the method of FIG. 3 may apply. For brevity, another example method devoted specifically to the heat mode is not shown, but instead the concepts of the methodology discussed in detail above with regard to FIG. 3 will be briefly discussed in terms of operating in the heat mode.

For example, at an engine cold start, the controller may determine that an emissions control device (or component thereof) is below a threshold temperature (e.g., below its light-off temperature). For discussion purposes, the emissions control device will be referred to simply as a catalyst. In such an example, late post in-cylinder fuel injection may be provided to a selected number of engine cylinders (e.g., all engine cylinders, or a subset of engine cylinders), such that unburnt hydrocarbons are communicated to the exhaust for raising the temperature of the catalyst. An amount of fuel corresponding to the late post in-cylinder fuel injections for each engine cylinder may be a function of a difference between desired catalyst temperature, and current catalyst temperature. The amount of fuel may additionally be a function of ambient temperature, for example.

With the late post in-cylinder fuel injections being provided, the methodology may include monitoring temperature of the catalyst, and monitoring combustion quality metrics, in similar fashion as that discussed above. In a situation where catalyst temperature reaches the desired catalyst temperature without the combustion quality metrics providing an indication of a cylinder or cylinders associated with sticking exhaust valve(s), then no mitigating action may be taken in terms of the late post in-cylinder fuel injections, and the late post in-cylinder fuel injections may simply be discontinued in response to the catalyst reaching the desired catalyst temperature.

However, in a situation where the combustion quality metrics indicate that a cylinder or cylinders are associated with a sticking exhaust valve, then similar to that discussed above at step 355 of method 300, late post in-cylinder fuel injection may be discontinued for the particular cylinders, and the corresponding fuel amount that was discontinued may be distributed evenly throughout remaining engine cylinders for which exhaust valve sticking was not indicated. Furthermore, the main injection for the cylinders identified as having sticking exhaust valves may be advanced, similar to that discussed above.

With late post in-cylinder fuel injection discontinued for particular engine cylinders, the methodology may include continuing to monitor exhaust catalyst temperature, and continuing to monitor combustion quality metrics. In a situation where combustion quality metrics indicate that a cylinder for which the late post in-cylinder fuel injection was discontinued no longer is associated with a sticking exhaust valve, then the late post in-cylinder fuel injections may resume for that particular cylinder. In some examples the late post in-cylinder fuel injections may resume immediately in response to the indication that the cylinder is no longer associated with the sticking exhaust valve, whereas in other examples the late post in-cylinder fuel injections may resume after a threshold time has elapsed since the indication that the cylinder is no longer associated with the sticking exhaust valve.

The methodology for operating in the heat mode may continue as discussed until it is indicated that the catalyst temperature has reached the desired catalyst temperature, at which point late post in-cylinder fuel injections may be discontinued for all engine cylinders.

Thus, discussed herein, a method may comprise adjusting an amount of a fuel that is provided to each of a plurality of cylinders of an engine during an exhaust stroke of the engine in response to an indication of a degraded combustion quality stemming from a cylinder that is one of the plurality of cylinders receiving the fuel.

For such a method, the degraded combustion quality may be due to operational degradation of an exhaust valve of the cylinder.

For such a method, adjusting the amount of fuel may include discontinuing providing the fuel to the cylinder for which the degraded combustion quality is indicated.

For such a method, adjusting the amount of the fuel may include increasing the amount of fuel provided to the plurality of cylinders excluding the cylinder for which the degraded combustion quality is indicated.

For such a method, the method may further comprise providing the fuel to each of the plurality of cylinders of the engine in response to a request to raise a temperature of an emissions control device to a desired temperature.

For such a method, the method may further comprise providing each of the plurality of cylinders of the engine with a main fuel injection that occurs between a compression stroke and a power stroke of the engine. In some examples, the method may include advancing a timing of the main fuel injection for the cylinder for which the degraded combustion quality is indicated, and maintaining the timing of the main fuel injection for each of the plurality of cylinders that do not include the cylinder for which the degraded combustion quality is indicated.

In some examples of such a method, the engine may be a diesel engine.

For such a method, the method may further comprise restoring the amount of the fuel that is provided to each of the plurality of cylinders to an original amount subsequent to the adjusting in response to an indication that the cylinder no longer is associated with the degraded combustion quality.

For such a method, restoring the amount of fuel to the original amount may occur after a threshold time duration or a threshold number of engine cycles from a point when the cylinder is determined to no longer be associated with the degraded combustion quality.

Another example of a method may comprise, for each of a plurality of cylinders of an engine, providing a first fuel injection amount during an exhaust stroke of the engine, monitoring each of the plurality of cylinders for an indication of degraded combustion, and in response to a cylinder being indicated to have the degraded combustion, discontinuing providing fuel to the cylinder and in turn providing a second fuel injection amount to remaining cylinders.

For such a method, the second fuel injection amount may be a sum of the first fuel injection amount and the first fuel injection amount divided by a number of the remaining cylinders.

For such a method, the method may further include continuing to monitor the cylinder for which fueling is discontinued, and in response to the indication of degraded combustion no longer being present for the cylinder, again providing the first fuel injection amount to each of the plurality of cylinders.

For such a method, the method may further include providing a main fuel injection amount to each of the plurality of cylinders between a compression stroke and a power stroke of the engine, and maintaining the main fuel injection amount to each of the plurality of cylinders responsive to the cylinder being indicated to have the degraded combustion. In some examples, the method may include advancing a timing of the main fuel injection amount for the cylinder responsive to the cylinder being indicated to have the degraded combustion.

Turning now to FIG. 4, a prophetic example timeline 400 is depicted, illustrating an example of how the method of FIG. 3 may be used responsive to a request to regenerate a DPF (e.g., DPF 72 at FIG. 1). Timeline 400 includes plot 405, indicating whether DPF regeneration conditions are met (yes or no), over time. Timeline 400 further includes plot 410, indicating a main fuel injection for cylinder 1 of a four cylinder engine, and plot 415, indicating a late post in-cylinder injection for cylinder 1. Timeline 400 further includes plot 420, indicating a main fuel injection for cylinder 3, and plot 425, indicating a late post in-cylinder injection for cylinder 3. Timeline 400 further includes plot 430, indicating a main fuel injection for cylinder 4, and plot 435, indicating a late post in-cylinder injection for cylinder 4. Timeline 400 further include plot 440, indicating a main fuel injection for cylinder 2, and plot 445, indicating a late post in-cylinder injection for cylinder 2. Below the x-axis (refer to inset 402) of cylinder 2 is depicted I C P E, corresponding to the strokes of the engine cycle (intake, compression, power, and exhaust). It may be understood that the I C P E designations pertain to each of cylinder 1, cylinder 3, cylinder 4 and cylinder 2. Timeline 400 further includes plot 450, indicating whether exhaust valve degradation (e.g., exhaust valve sticking) is indicated for each cylinder 1-4, or not (no). Timeline 400 further includes plot 455, indicating engine speed as monitored, for example, via the engine speed sensor (e.g., engine speed sensor 118 at FIG. 1). The x-axis corresponding to each of the plots is time.

At time t0, DPF regeneration conditions are met, and while not explicitly illustrated it may be understood that the process of DPF regeneration that includes late post in-cylinder fuel injection is in progress. As mentioned above, conditions for initiating DPF regeneration may include an amount of particulate matter stored at the filter exceeding a threshold amount, a pressure drop across the DPF reaching or exceeding a threshold pressure drop, etc.

The firing order of the four cylinder engine depicted at FIG. 4 is 1-3-4-2. Thus, between time t0 and t1, the main fuel injection 410 for cylinder 1 is provided between the compression and power strokes, similar to that indicated at FIG. 2 above. The late post in-cylinder fuel injection 415 for cylinder 1 is then provided during the exhaust stroke between time t0 and t1. In similar fashion, between time t1 and t2, the main fuel injection 420 for cylinder 3 is provided between the compression and power strokes, and then the late post in-cylinder fuel injection 425 for cylinder 3 is provided during the exhaust stroke between time t1 and t2. Between time t2 and t3, the main fuel injection 430 for cylinder 4 is provided between the compression and power strokes, and then the late post in-cylinder fuel injection 435 for cylinder 4 is provided during time t2 and t3. Between time t3 and t4, the main fuel injection 440 for cylinder 2 is provided between the compression and power strokes, and then the late post in-cylinder fuel injection 445 for cylinder 2 is provided between time t3 and t4. Between time t0 and t4, combustion quality metrics are monitored. As an example combustion quality metric, depicted is engine speed (plot 455). Engine speed is indicated to drop by an amount greater than a threshold engine speed drop (indicated by line 456) between time t1 and t2, and based on such an indication, at time t4 the controller indicates that the exhaust valve associated with cylinder 3 is sticking, or in other words, operation of the exhaust valve associated with cylinder 3 has become degraded. While a single combustion metric is depicted (e.g., engine speed), it may be understood that in some examples the combustion metric may be monitored over a predetermined number of engine cycles, and the engine speed drop may be averaged together to filter out any noise associated with the engine speed measurement. Additionally, while not explicitly illustrated, other combustion metrics such as fuel balance control, knock, maximum cylinder pressure, etc., may additionally or alternatively be relied upon for inferring a sticking exhaust valve associated with a particular engine cylinder.

Accordingly, the late post in-cylinder fuel injection (refer to 425) for cylinder 3 is discontinued, and the amount of fuel injection corresponding to the late post in-cylinder fuel injection of cylinder 3 is divided up evenly among the remaining engine cylinders 1, 4, and 2 (refer to plots 416, 436, and 446, respectively). Thus, it may be understood that the late post in-cylinder fuel injection amounts for cylinder 1, cylinder 4 and cylinder 2 are each of a greater amount subsequent to the discontinuing of the late post in-cylinder fuel injection for cylinder 3 (after time t4), as compared to prior to the discontinuing of the late post in-cylinder fuel injection for cylinder 3 (before time t4).

Accordingly, between time t4 and t5, the main fuel injection 410 for cylinder 1 occurs between the compression and power strokes, and then the late post in-cylinder fuel injection for cylinder 1 occurs during the exhaust stroke between time t4 and t5. Between time t5 and t6, the main fuel injection 420 is advanced, and is indicated as main fuel injection 426, and main fuel injection 420 is indicated as a dashed line to illustrate that the main fuel injection has been advanced. Between time t6 and t7, the main fuel injection 430 occurs between the compression and power strokes, and then the late post in-cylinder fuel injection for cylinder 4 occurs during the exhaust stroke between time t6 and t7. Furthermore, the engine speed drop (plot 455) associated with cylinder 3 continues to be greater than the threshold engine speed drop (refer to line 456), although the engine speed drop is smaller. Thus, it may be understood that the combustion quality metrics are indicative that the exhaust valve is becoming unstuck, but that the sticking is not yet entirely remedied. Between time t7 and t8, the main fuel injection 440 occurs between the compression and power strokes, and then the late post in-cylinder fuel injection for cylinder 2 occurs during the exhaust stroke between time t7 and t8.

Thus, example timeline 400 illustrates how, during a DPF regeneration event, combustion quality metrics may be monitored so as to infer exhaust valve sticking associated with a particular engine cylinder, and in response, the providing of the late post in-cylinder fuel injection to the cylinder associated with the exhaust valve sticking may be discontinued. Example timeline 400 further illustrates how the fuel amount corresponding to the late post in-cylinder fuel injection that is discontinued is reallocated to remaining engine cylinders, such that a total late post in-cylinder fuel injection amount for the engine is maintained even under conditions where late post in-cylinder fuel injection for a cylinder or cylinders has been discontinued.

Due to space constraints and for illustrative purposes, just a section of the DPF regeneration event is depicted at FIG. 4. However, it may be understood that the pressure across the DPF may be monitored for such a DPF regeneration event, and in response to the pressure drop decreasing to below the threshold pressure drop, late post in-cylinder fuel injections may be discontinued for all engine cylinders, as discussed above in detail with regard to FIG. 3.

Turning now to FIG. 5, depicted is another prophetic example timeline 500, depicting how the method of FIG. 3 may be used to conduct a DPF regeneration procedure. Timeline 500 includes plot 505, indicating whether DPF regeneration conditions are met (yes or no), over time. Timeline 500 further includes plot 510, indicating a main fuel injection for cylinder 1. Timeline 500 further includes plot 515, indicating a late post in-cylinder fuel injection for cylinder 1. Plot 515 is divided into 515a, corresponding to an original fuel injection amount, and 515b, corresponding to an additional fuel injection amount due to the late post in-cylinder fuel injection for cylinder 2 being discontinued, as will be discussed in further detail below. Timeline 500 further includes plot 520, indicating a main fuel injection for cylinder 3. Timeline 500 further includes plot 525, indicating a late post in-cylinder fuel injection for cylinder 3. Plot 525 is divided into 525a, corresponding to an original fuel injection amount, and 525b, corresponding to an additional fuel injection amount due to the late post in-cylinder fuel injection for cylinder 2 being discontinued. Timeline 500 further includes plot 530, indicating a main fuel injection for cylinder 4. Timeline 500 further includes plot 535, indicating a late post in-cylinder fuel injection for cylinder 4. Plot 535 is divided into 535a, corresponding to an original fuel injection amount, and 535b, corresponding to an additional fuel injection amount due to the late post in-cylinder fuel injection for cylinder 2 being discontinued. Timeline 500 further includes plot 540, indicating a main fuel injection for cylinder 2. Timeline 500 further includes plot 545, indicating a late post in-cylinder fuel injection amount for cylinder 2. Below the x-axis (refer to inset 502) of cylinder 2 is depicted I C P E, corresponding to the strokes of the engine cycle (intake, compression, power, and exhaust). It may be understood that the I C P E designations pertain to each of cylinder 1, cylinder 3, cylinder 4 and cylinder 2. Timeline 500 further includes plot 550, indicating whether exhaust valve degradation (e.g., exhaust valve sticking) is indicated for each cylinder 1-4, or not (no). The x-axis corresponding to each of the plots is time.

At time t0, DPF regeneration conditions are met (plot 505), and it may be understood that the DPF regeneration process has been ongoing for some amount of time. Thus, at time t0, it has already been indicated that there is operational degradation of the exhaust valve (e.g., exhaust valve sticking) corresponding to engine cylinder 2 (plot 550). While not explicitly illustrated, it may be understood that any one of the combustion quality metrics (or a combination thereof) discussed above with regard to FIG. 3 may be relied upon for inferring a presence or absence of exhaust valve sticking associated with a cylinder or cylinders of the engine.

The firing order of the four cylinder engine depicted at FIG. 5 is 1-3-4-2. Thus, between time t0 and t1, the main fuel injection 510 for cylinder 1 is provided between the compression and power strokes, similar to that indicated at FIG. 2 above. Then, during the exhaust stroke between time t0 and t1, the late post in-cylinder fuel injection 515 for cylinder 1 is provided. Because the late post in-cylinder fuel injection for cylinder 2 has been discontinued, the late post in-cylinder fuel injection 515 includes an original fuel amount (515a) corresponding to an amount of fuel provided for the late post in-cylinder fuel injection for cylinder 1 prior to cylinder 2 being designated as having a sticking exhaust valve, as well as an additional fuel injection amount (515b) that reflects ⅓ of the late post in-cylinder fuel injection amount originally provided via cylinder 2 (now discontinued). Similar logic applies to the time frames spanning time t1 and t2, time t2 and t3. Briefly, between time t1 and t2, the main fuel injection 520 for cylinder 3 is provided between the compression and power strokes. Then, during the exhaust stroke between time t1 and t2, the late post in-cylinder fuel injection 525 for cylinder 3 is provided. Similar to that discussed above for cylinder 1, the late post in-cylinder fuel injection for cylinder 3 includes an additional amount (525*b*) that reflects ⅓ of the late post in-cylinder fuel injection amount originally provided via cylinder 2 (now discontinued). Between time t2 and t3, the main fuel injection 530 for cylinder 4 is provided between the compression and power strokes. Then, during the exhaust stroke between time t2 and t3, the late post in-cylinder fuel injection 535 for cylinder 4 is provided. Similar to that discussed above for cylinder 1 and cylinder 3, the late post in-cylinder fuel injection 535 for cylinder 4 includes an additional amount (535*b*) that reflects ⅓ of the late post in-cylinder fuel injection amount original provided via cylinder 2 (now discontinued). Between time t3 and t4, the main fuel injection 540 for cylinder 2 is provided between the compression and power strokes. However, due to the exhaust valve associated with cylinder 2 having been indicated to be sticking (plot 550), cylinder 2 is not provided with a late post in-cylinder fuel injection.

Between time t0 and t4, it may be understood that combustion quality metrics are monitored as discussed above in detail with regard to FIG. 3, and at time t4 it is indicated that the exhaust valve associated with cylinder 2 is no longer sticking (refer to plot 550), or in other words, is once again functioning as desired or expected. Furthermore, at time t4, no other engine cylinders are indicated to have associated exhaust valves that are indicated to be stuck in an at least partially open configuration. As mentioned above, in some examples, immediately responsive to an indication that a sticking exhaust valve has become unstuck, late post in-cylinder fuel injection to the associated cylinder may once again be provided. However, in other examples a predetermined threshold amount of time may have to elapse prior to once again providing the late post in-cylinder fuel injection. In this example timeline 500, such a threshold amount of time is indicated via line 555.

As indicated, after time t4 some amount of time elapses, the time being greater than the threshold amount of time (line 555). Prior to the threshold amount of time elapsing, while not explicitly illustrated, it may be understood that each of cylinder 1, cylinder 3, cylinder 4 and cylinder 2 are operated in the same manner as that discussed above with regard to the time frame spanning time t0 and t4. However, in response to the threshold amount of time elapsing, late post in-cylinder fuel injection is once again provided to the cylinder for which the late post in-cylinder fuel injection was previously discontinued. Accordingly, between time t4 and t5, the main injection 510 for cylinder 1 is provided between the compression and power strokes, and the late post in-cylinder fuel injection 515 is provided during the exhaust stroke. The late post in-cylinder fuel injection amount is returned to the amount defined by 515*a*, since the additional fuel injection amount (515*b*) is reallocated to the late post in-cylinder fuel injection of cylinder 2.

Similar logic applies to the time frames spanning time t5 and t6, and t6 and t7. Briefly, between time t5 and t6, the main fuel injection 520 for cylinder 3 is provided between the compression and power strokes, and the late post in-cylinder fuel injection 525 is provided during the exhaust stroke. The late post in-cylinder fuel injection amount is returned to the amount defined by 525*a*, since the additional fuel injection amount (525*b*) is reallocated to the late post in-cylinder fuel injection of cylinder 2. Between time t6 and t7, the main fuel injection 530 for cylinder 4 is provided between the compression and power strokes, and the late post in-cylinder fuel injection 535 is provided during the exhaust stroke. The late post in-cylinder fuel injection amount is returned to the amount defined by 535*a*, since the additional fuel injection amount (535*b*) is reallocated to the late post in-cylinder fuel injection of cylinder 2. Between time t7 and t8, the main fuel injection 540 for cylinder 2 is provided between the compression and power strokes, and the late post in-cylinder fuel injection 545 is provided during the exhaust stroke.

Thus, the timeline of FIG. 5 illustrates how combustion quality metrics may be used to infer when an exhaust valve for a particular engine cylinder is no longer exhibiting sticking behavior, and whereby in response the late post in-cylinder fuel injections for that particular cylinder may be resumed. Furthermore, the amount of additional fuel provided to other cylinders that were not associated with a sticking exhaust valve may be reduced by an amount that is a function of the amount reallocated to the cylinder for which the exhaust valve is no longer sticking.

It may be understood that the timeline of FIG. 5 depicts just a portion of the DPF regeneration process. Thus, it may be understood that the process depicted by FIG. 5 may include monitoring a pressure drop across the DPF, and when the pressure drop has decreased to below a predetermined threshold pressure drop, the late post in-cylinder fuel injections for each cylinder may be discontinued.

Furthermore, prophetic example timelines are not provided for situations where a heat mode is requested, for example as may be the case at an engine cold-start event, due to the similarity in the manner in which late post in-cylinder fuel injections are controlled. However, it may be understood that the concepts discussed above with regard to the prophetic example timelines of FIGS. 4-5 may similarly apply to situations where the controller requests a heat mode of operation to raise a catalyst to a desired operational temperature (e.g., light-off temperature).

In this way, operational degradation of one or more exhaust valves associated with one or more engine cylinders may be inferred while an engine system of a vehicle is being operated in a heat mode of operation where late post in-cylinder fuel injections are used to raise a temperature of an exhaust catalyst to a desired operational temperature, and/or while the engine system is being operated in a regenerative mode of operation where late post in-cylinder fuel injections are used to regenerate a DPF.

The technical effect of inferring operational degradation of one or more exhaust valves associated with one or more engine cylinders during the heat mode and/or the regenerative mode is that mitigating action may be taken to reduce the operational degradation of the exhaust valve(s) while continuing to operate in the heat mode and/or the regenerative mode, such that when the heat mode and/or regenerative mode is completed, the issue of the exhaust valve operational degradation is no longer present. Specifically, the technical effect of inferring operational degradation of one or more exhaust valves is that it may then be possible to discontinue the providing of late post in-cylinder fuel injection to the cylinder(s) with degraded exhaust valve operation, where the discontinuing of the providing of late post in-cylinder fuel injection may serve to reverse the issue of the degraded exhaust valve operation. In other words, discontinuing the providing of late post in-cylinder fuel injection to cylinders may serve to "unstick" the exhaust valve, such that the exhaust valve may once again function as desired. This action may broadly serve to reduce or avoid engine system degradation that may otherwise occur if the exhaust valve were to be maintained in a stuck position. Thus, a further technical effect is that, responsive to discontinuing late post in-cylinder fuel injection to an engine cylinder, an amount of late post in-cylinder fuel injection for remaining cylinders may be proportionally increased such that the heat mode operation and/or regenerative operation may continue essentially unaffected.

Thus, the systems and methods discussed herein may enable one or more systems and one or more methods. In one example, a method comprises adjusting an amount of a fuel that is provided to each of a plurality of cylinders of an engine during an exhaust stroke of the engine in response to an indication of a degraded combustion quality stemming from a cylinder that is one of the plurality of cylinders receiving the fuel. In a first example of the method, the method further includes wherein the degraded combustion quality is due to operational degradation of an exhaust valve of the cylinder. A second example of the method optionally includes the first example, and further includes wherein adjusting the amount of the fuel includes discontinuing providing the fuel to the cylinder for which the degraded combustion quality is indicated. A third example of the method optionally includes any one or more or each of the first through second examples, and further includes wherein adjusting the amount of the fuel includes increasing the amount of fuel provided to the plurality of cylinders excluding the cylinder for which the degraded combustion quality is indicated. A fourth example of the method optionally includes any one or more or each of the first through third examples, and further comprises providing the fuel to each of the plurality of cylinders of the engine in response to a request to raise a temperature of an emissions control device to a desired temperature. A fifth example of the method optionally includes any one or more or each of the first through fourth examples, and further comprises providing each of the plurality of cylinders of the engine with a main fuel injection that occurs between a compression stroke and a power stroke of the engine. A sixth example of the method optionally includes any one or more or each of the first through fifth examples, and further comprises advancing a timing of the main fuel injection for the cylinder for which the degraded combustion quality is indicated; and maintaining the timing of the main fuel injection for each of the plurality of cylinders that do not include the cylinder for which the degraded combustion quality is indicated. A seventh example of the method optionally includes any one or more or each of the first through sixth examples, and further includes wherein the engine is a diesel engine. A ninth example of the method optionally includes any one or more or each of the first through eighth examples, and further comprises restoring the amount of the fuel that is provided to each of the plurality of cylinders to an original amount subsequent to the adjusting in response to an indication that the cylinder no longer is associated with the degraded combustion quality. A tenth example of the method optionally includes any one or more or each of the first through ninth examples, and further includes wherein restoring the amount of fuel to the original amount occurs after a threshold time duration or a threshold number of engine cycles from a point when the cylinder is determined to no longer be associated with the degraded combustion quality.

Another example of a method comprises, for each of a plurality of cylinders of an engine, providing a first fuel injection amount during an exhaust stroke of the engine; monitoring each of the plurality of cylinders for an indication of degraded combustion; and in response to a cylinder being indicated to have the degraded combustion, discontinuing providing fuel to the cylinder, and in turn providing a second fuel injection amount to remaining cylinders. In a first example of the method, the method further includes wherein the second fuel injection amount is a sum of the first fuel injection amount and the first fuel injection amount divided by a number of the remaining cylinders. A second example of the method optionally includes the first example, and further comprises continuing to monitor the cylinder for which fueling is discontinued; and in response to the indication of degraded combustion no longer being present for the cylinder, again providing the first fuel injection amount to each of the plurality of cylinders. A third example of the method optionally includes any one or more or each of the first through second examples, and further comprises providing a main fuel injection amount to each of the plurality of cylinders between a compression stroke and a power stroke of the engine; and maintaining the main fuel injection amount to each of the plurality of cylinders responsive to the cylinder being indicated to have the degraded combustion. A fourth example of the method optionally includes any one or more or each of the first through third examples, and further comprises advancing a timing of the main fuel injection amount for the cylinder responsive to the cylinder being indicated to have the degraded combustion.

An example of a system for a vehicle comprises an engine with a plurality of engine cylinders each of which include an intake valve, an exhaust valve, and a fuel injector; an emissions control device positioned in an exhaust system of the engine; and a controller with computer readable instructions stored on non-transitory memory that when executed, cause the controller to: command a main fuel injection for each of the plurality of engine cylinders, the main fuel injection occurring between a compression stroke and a power stroke; receive a request to increase a temperature of the emissions control device; provide a first late fuel injection amount to each of the plurality of engine cylinders subsequent to the main fuel injection; monitor each of the plurality of engine cylinders for an indication of degraded combustion while commanding the first late fuel injection amount to each of the plurality of engine cylinders; and in response to a cylinder being identified as having degraded combustion, discontinue providing the first late fuel injection amount to the cylinder, and providing a second fuel injection amount to remaining engine cylinders of the plurality of engine cylinders. In a first example of the system, the system further includes wherein the controller stores further instructions to advance a timing of the main fuel injection to the cylinder identified as having degraded combustion, without advancing the timing of the main fuel injection to remaining engine cylinders. A second example of the system optionally includes the first example, and further comprises an engine speed sensor; and wherein the controller stores further instructions to provide the indication of degraded combustion in response to an engine speed change greater than a threshold engine speed change stemming from combustion in the cylinder. A third example of the system optionally includes any one or more or each of the first through second examples, and further includes wherein each of the plurality of engine cylinders further comprises a pressure sensor; and wherein the controller stores further instructions to monitor a maximum pressure in each of the plurality of engine cylinders that are receiving the first late fuel injection amount per engine cycle, and provide the indication of degraded combustion for the cylinder when the maximum pressure is greater than a threshold different than an expected maximum pressure. A fourth example of the system optionally includes any one or more or each of the first through third examples, and further includes wherein the controller stores further instructions to divide the first late fuel injection amount by a number of remaining engine cylinders in response to discontinuing providing the first late fuel injection amount to the cylinder to obtain an adjusted fuel amount; and where the second fuel injection amount is a sum of the first late fuel injection amount and the adjusted fuel amount.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine, comprising:
via a controller of the engine,
adjusting an amount of a fuel that is provided by fuel injectors to each of a plurality of cylinders of the engine during an exhaust stroke of the engine in response to an indication of a degraded combustion quality, the degraded combustion quality determined to be stemming from a cylinder that is one of the plurality of cylinders receiving the fuel due to operational degradation of an exhaust valve of the cylinder,
wherein the operational degradation of the exhaust valve for the cylinder is determined based on combustion metrics that include one or more of engine speed, fuel balance control, knock, and maximum cylinder pressure, and wherein the combustion metrics are based on information retrieved from one or more sensors of the engine.

2. The method of claim 1, wherein adjusting the amount of the fuel includes discontinuing late post in-cylinder fuel injection to the cylinder that the degraded combustion quality is determined to be stemming from due to the operational degradation of the exhaust valve of the cylinder.

3. The method of claim 1, wherein adjusting the amount of the fuel includes discontinuing providing the fuel to the cylinder for which the degraded combustion quality is indicated.

4. The method of claim 1, wherein adjusting the amount of the fuel includes increasing the amount of fuel provided to the plurality of cylinders excluding the cylinder for which the degraded combustion quality is indicated.

5. The method of claim 1, further comprising providing the fuel to each of the plurality of cylinders of the engine in response to a request to raise a temperature of an emissions control device to a desired temperature, the temperature of the emissions control device based on an emissions control system temperature sensor.

6. The method of claim 1, further comprising providing each of the plurality of cylinders of the engine with a main fuel injection that occurs between a compression stroke and a power stroke of the engine.

7. The method of claim 6, further comprising advancing a timing of the main fuel injection for the cylinder for which the degraded combustion quality is indicated; and
maintaining the timing of the main fuel injection for each of the plurality of cylinders that do not include the cylinder for which the degraded combustion quality is indicated.

8. The method of claim 1, wherein the engine is a diesel engine.

9. The method of claim 1, further comprising restoring the amount of the fuel that is provided to each of the plurality of cylinders to an original amount subsequent to the adjusting in response to an indication that the cylinder no longer is associated with the degraded combustion quality.

10. The method of claim 9, wherein restoring the amount of fuel to the original amount occurs after a predetermined threshold time duration or a threshold number of engine cycles measured via angular position sensors from a point when the cylinder is determined to no longer be associated with the degraded combustion quality.

* * * * *